(12) United States Patent
Chen

(10) Patent No.: US 8,487,899 B2
(45) Date of Patent: Jul. 16, 2013

(54) CAPACITIVE-TYPE TOUCH PANEL AND TOUCH-POINT DETECTING METHOD THEREOF

(75) Inventor: Chun-Yu Chen, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 787 days.

(21) Appl. No.: 12/502,242

(22) Filed: Jul. 14, 2009

(65) Prior Publication Data
US 2010/0090980 A1   Apr. 15, 2010

(30) Foreign Application Priority Data
Oct. 13, 2008 (TW) ................................ 97139257 A

(51) Int. Cl.
*G06F 3/044* (2006.01)
(52) U.S. Cl.
USPC ........................................................ 345/174
(58) Field of Classification Search
None
See application file for complete search history.

(56) References Cited

U.S. PATENT DOCUMENTS

| | | | |
|---|---|---|---|
| 4,550,221 A | 10/1985 | Mabusth | |
| 4,733,222 A | 3/1988 | Evans | |
| 6,297,811 B1 | 10/2001 | Kent et al. | |
| 7,109,978 B2 | 9/2006 | Gillespie et al. | |
| 7,202,859 B1 | 4/2007 | Speck et al. | |
| 7,663,607 B2 * | 2/2010 | Hotelling et al. | 345/173 |
| 8,040,321 B2 * | 10/2011 | Peng et al. | 345/169 |
| 8,059,015 B2 * | 11/2011 | Hua et al. | 341/33 |
| 2007/0296709 A1 | 12/2007 | Guanghai | |
| 2008/0007534 A1 * | 1/2008 | Peng et al. | 345/173 |
| 2008/0150906 A1 | 6/2008 | Grivna | |

FOREIGN PATENT DOCUMENTS

| | | |
|---|---|---|
| TW | I269213 B | 7/2005 |
| TW | 200834391 A | 8/2008 |

OTHER PUBLICATIONS

Office Action from Taiwan Patent Office dated Jan. 19, 2012.

\* cited by examiner

*Primary Examiner* — K. Wong
(74) *Attorney, Agent, or Firm* — Chun-Ming Shih

(57) ABSTRACT

A capacitive-type touch panel and a touch-point detecting method thereof are provided. The capacitive-type touch panel includes a plurality of first-dimension sensing lines and a plurality of second-dimension sensing lines arranged crossing over one another and in a matrix. When detecting a first touch point and a second touch point existed on the capacitive-type touch panel at the same time by scanning the capacitive-type touch panel, locations of the first touch point and the second touch point are determined according to detected currents in the first-dimension sensing lines and the second-dimension sensing lines. Capacitances of each of the first-dimension sensing lines are gradually decreased along a first direction, and capacitances of each of the second-dimension sensing lines are gradually decreased along a second direction.

12 Claims, 4 Drawing Sheets

CAPACITIVE-TYPE TOUCH PANEL AND TOUCH-POINT DETECTING METHOD THEREOF

CROSS-REFERENCE TO RELATED APPLICATIONS

This application is based upon and claims the benefit of priority from the prior Taiwanese Patent Application No. 097139257, filed Oct. 13, 2008, the entire contents of which are incorporated herein by reference.

BACKGROUND

1. Technical field

The present invention generally relates to a touch panel, and particularly to a capacitive-type touch panel and a touch-point detecting method thereof.

2. Description of the Related Art

With the progress of the science and technology, people's lives are closely related to various electronic devices, especially for multimedia information systems such as televisions, computers and mobile communicating systems, etc., are often used by the majority of people. Therefore, how to facilitate users to conveniently operate or carry such electronic devices has been becoming an important issue. In addition, in order to reduce the bulk of such electronic devices, touch panels have been becoming a common technology, to replace some input devices such as keyboards or mice.

Generally speaking, the touch panels are primarily classified into the resistive-type touch panels, capacitive-type touch panels, and optical-type touch panels, etc., depending on the manner of a touch point is detected. For example, the capacitive-type touch panels use a current variation caused by a capacitance generated at a touch point to detect the location of the touch point, such a detecting method is disclosed in a U.S. Pat. No. 6,297,811 in detail, the disclosure is taken as a technical reference and thus will not be repeated herein.

However, since the capacitive-type touch panels are limited by the established detecting technologies, the applications may not be effectively extended. Referring to FIG. 1, a schematic structure view of sensing lines of a conventional capacitive touch panel 10 is provided. The sensing lines E1, E2, . . . , E9 are termed as first-dimension sensing lines, and the sensing lines E31, E32, . . . , E39 are termed as second-dimension sensing lines. The first-dimension sensing lines are parallel with one another (every two adjacent first dimension sensing lines have a predetermined distance existed therebetween), the second-dimension sensing lines are parallel with one another as well (every two adjacent second-dimension sensing lines also have a predetermined distance existed therebetween). Furthermore, the first-dimension sensing lines E1, E2, . . . , E9 are arranged crossing over the second-dimension sensing lines E31, E32, . . . , E39 and so as to be arranged as an array. Capacitances of each of the sensing lines are the same, for example each of the sensing lines employs a plurality of capacitive pads 100 as sensors. The capacitive-type touch panel 10 employs a processor 12 to scan the first-dimension sensing lines E1, E2, . . . , E9 and the second-dimension sensing lines E31, E32, . . . , E39 and further to judge the location of a touch point on the capacitive-type touch panel 10 and contacted by an object according to a current caused by a capacitance formed between the object contacting with capacitive-type touch panel 10 and such a capacitive pad 100.

According to the above-mentioned detecting method, the capacitive-type touch panel 10 may easily detect the location of single touch point. However, when there are at least two touch points existed at the same time, although the processor 12 may correspondingly obtain at least two coordinate values on the first-dimension sensing lines and the second-dimension sensing lines at the same time, the processor 12 may not determine pairing relationships of the coordinate values. In other words, since the first-dimension sensing lines and the second-dimension sensing lines are scanned respectively, the processor 12 may obtain locations of at least two touch points on the first-dimension sensing lines as well as locations of at least two touch points on the second-dimension sensing lines. However, the conventional detecting method may not determine one of the locations of the touch points on the first-dimension sensing lines correspond to one of the locations of the touch points on the second-dimension sensing lines.

In view of the above, the capacitive-type touch panel 10 may not detect the accurate locations of the at least two touch points existed at the same time, which would result in the capacitive-type touch panel having many limitations in application.

BRIEF SUMMARY

The present invention provides a capacitive-type touch panel, which may accurately detect locations of a plurality of touch points existed at the same time.

The present invention also relates to a touch point detecting method of capacitive-type touch panel, which may detect locations of a plurality of touch points on a capacitive-type touch panel and existed at the same time.

Other objectives, features and advantages of the present invention will be further understood from the technological features disclosed by various embodiments of the present invention.

A capacitive-type touch panel configured for detecting a touch point when an object touches the capacitive-type touch panel in accordance with an exemplary embodiment of the present invention is provided. The capacitive-type touch panel includes a plurality of first-dimension sensing lines and a processor. The first-dimension sensing lines of the capacitive-type touch panel, extending along a first direction and (i.e., structured and arranged) generating capacitive effects with an object in proximity of the capacitive-type touch panel, are arranged in parallel with one another. Capacitances of each of the first-dimension sensing lines are gradually decreased along the first direction. The processor is configured for scanning the first-dimension sensing lines and determining a location of a touch point on the first-dimension sensing lines according to a result of the scanning.

In an exemplary embodiment of the present invention, the capacitive-type touch panel further includes a plurality of second-dimension sensing lines. The second-dimension sensing lines are arranged in parallel with one another and cross over the first-dimension sensing lines. Capacitances of each of the second-dimension sensing lines are gradually decreased along a second direction. The processor is further configured for scanning the second-dimension sensing lines and determining a location of the touch point on the second-dimension sensing lines according to another result of the scanning.

A touch-point detecting method of capacitive-type touch panel in accordance with an exemplary embodiment of the present invention is provided. The touch-point detecting method is adapted to detect a plurality of touch points on a capacitive-type touch panel. The capacitive-type touch panel includes a plurality of first-dimension sensing lines and a plurality of second-dimension sensing lines arranged in a matrix. The first-dimension sensing lines are arranged in parallel with one another and the second-dimension sensing lines are arranged in parallel with one another as well. The touch point detecting method of capacitive-type touch panel includes the following steps: scanning the first-dimension sensing lines and the second-dimension sensing lines of the capacitive-type touch panel; and when detecting a first touch point and a second touch point existed at the same time, determining locations of the first touch point and the second touch point according to detected currents in the first-dimension sensing lines and the second-dimension sensing lines when detecting the first touch point and the second touch point existed on the capacitive-type touch panel at the same time. Capacitances of each of the first-dimension sensing lines are gradually decreased along a first direction, and capacitances of each of the second-dimension sensing lines are gradually decreased along a second direction.

In an exemplary embodiment of the present invention, the above-mentioned step of determining the locations of the first touch point and the second touch point according to the detected currents in the first-dimension sensing lines and the second-dimension sensing lines when detecting the first touch point and the second touch point existed on the capacitive-type touch panel at the same time includes: obtaining a first coordinate value and a second coordinate value of the first touch point and the second touch point respectively on the first-dimension sensing lines according to the detected currents in the first-dimension sensing lines; obtaining a third coordinate value and a fourth coordinate value of the first touch point and the second touch point on the second-dimension sensing lines according to the detected currents in the second-dimension sensing lines; and determining how to put the first coordinate value, the second coordinate value, the third coordinate value, and the fourth coordinate value in pairs to obtain the locations of the first touch point and the second touch point according to the detected currents.

In an exemplary embodiment of the present invention, the above-mentioned step of determining how to put the first coordinate value, the second coordinate value, the third coordinate value, and the fourth coordinate value in pairs to obtaining the locations of the first touch point and the second touch point according to the detected currents is accomplished by at least one of the following four approaches:

(1) when the current obtained for detecting the first touch point on the first-dimension sensing lines is larger than the current obtained for detecting the second touch point in the first-dimension sensing lines, selecting one of the third coordinate value and the fourth coordinate value which is closer to a start point of the first direction as a second-dimension location of the first touch point;

(2) when the current obtained for detecting the first touch point on the first-dimension sensing lines is smaller than the current obtained for detecting the second touch point in the first-dimension sensing lines, selecting one of the third coordinate value and the fourth coordinate value which is closer to an end point of the first direction as a second-dimension location of the first touch point;

(3) when the current obtained for detecting the first touch point on the second-dimension sensing lines is larger than the current obtained for detecting the second touch point in the second-dimension sensing lines, selecting one of the first coordinate value and the second coordinate value which is closer to a start point of the second direction as a first-dimension location of the first touch point; and (4) when the current obtained for detecting the first touch point on the second-dimension sensing lines is smaller than the current obtained for detecting the second touch point in the second-dimension sensing lines, selecting one of the first coordinate value and the second coordinate value which is closer to an end point of the second direction as a first-dimension location of the first touch point.

Since the above-mentioned exemplary embodiments of the present invention employ the sensing lines having capacitances gradually decreased along a single direction, a relative location of a touch point may be obtained according to a current obtained for detecting the touch point (or a capacitance at the location of the touch point and acquired according to the detected current). When a plurality of touch points are existed on the capacitive-type touch panel associated with the embodiment of the present invention at the same time, accurate locations of such touch points also may be obtained by the same principle.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "left," "right," "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected,"

"coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
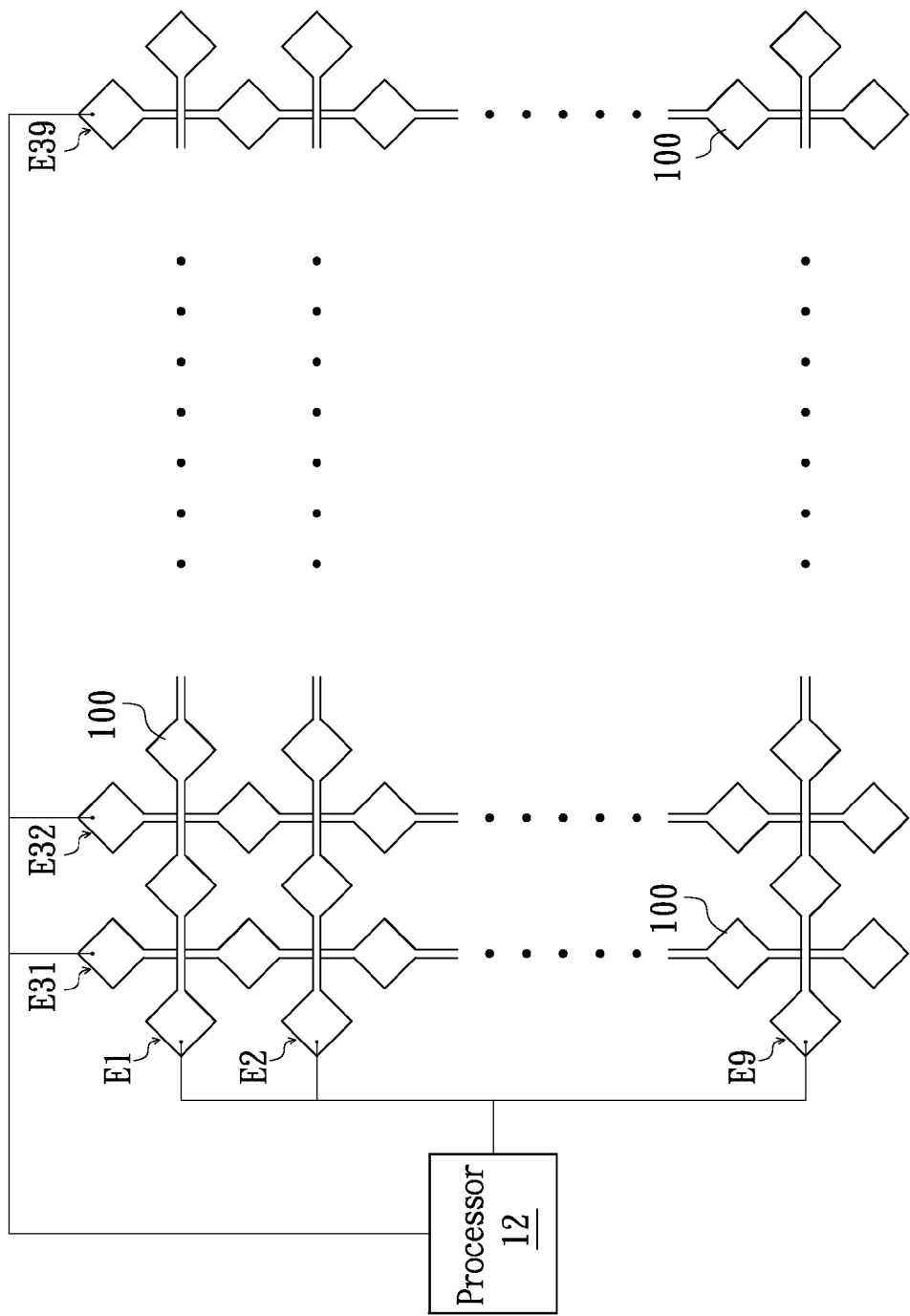
FIG. 1 is a schematic structure view of sensing lines of a conventional capacitive-type touch panel.
Figure 2:
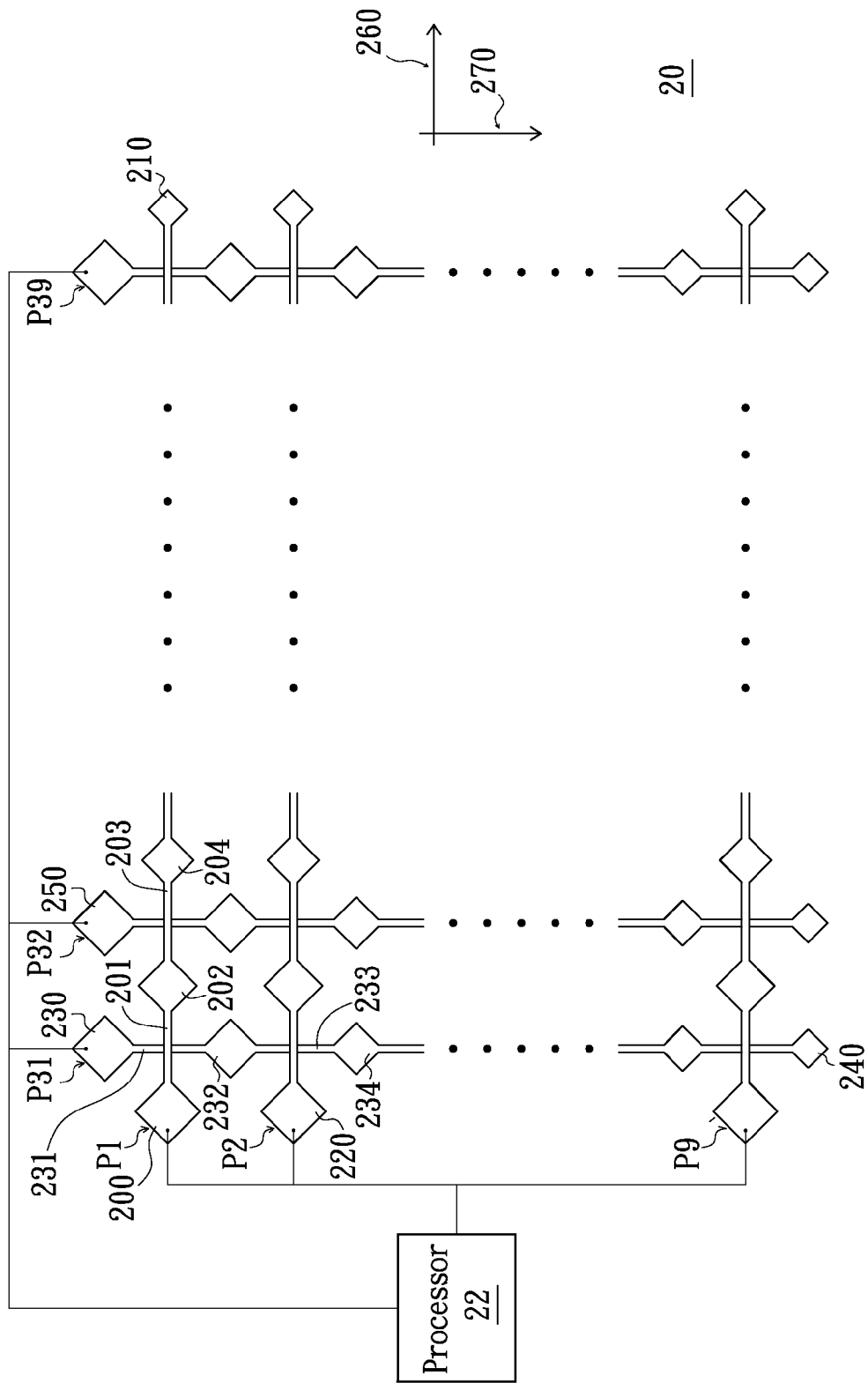
FIG. 2 is a schematic structure view of sensing lines of a capacitive-type touch panel in accordance with an exemplary embodiment of the present invention.

Referring to FIG. 2, a schematic structure view of sensing lines of a capacitive-type touch panel in accordance with an exemplary embodiment of the present invention is provided. The capacitive-type touch panel 20 includes horizontal sensing lines (hereinafter also referred to as first-dimension sensing lines) P1~P9, vertical sensing lines (hereinafter also referred to as second-dimension sensing lines) P31~P39, and a processor 22. Each of the first-dimension sensing lines P1~P9 and the second-dimension sensing lines P31~P39 has a plurality of capacitive pads e.g., 200~210 or 230~240. Such capacitive pads are configured (i.e., structured and arranged) for generating capacitive effects with an object in proximity of the capacitive-type touch panel 20.

For example, the first-dimension sensing line P1 includes the capacitive pads 200, 202, 204 and 210, etc. Touch areas of the capacitive pads 200~210 are gradually decreased along a direction 260 from left to right (hereinafter also referred to as first direction). The capacitive pad 200 and the capacitive pad 202 are electrically coupled with each other by a first-dimension conductive line segment 201 arranged therebetween, and the capacitive pad 202 and the capacitive pad 204 are electrically coupled with each other by a first-dimension conductive line segment 203 arranged therebetween. Similarly, touch areas of the capacitive pads of each of the other first-dimension sensing lines P2~P9 are gradually decreased along the first direction 260, and the corresponding two adjacent capacitive pads are electrically coupled with each other by a first-dimension conductive line segment arranged therebetween. On the other hand, the second-dimension sensing line P31 includes the capacitive pads 230, 232, 234 and 240, etc., and touch areas of the capacitive pads 230~240 are gradually decreased along a direction 270 from up to down (hereinafter also referred to as second direction). The capacitive pad 230 and the capacitive pad 232 are electrically coupled with each other by a second-dimension conductive line segment 231 arranged therebetween, and the capacitive pad 232 and the capacitive pad 234 are electrically coupled with each other by a second-dimension conductive line segment 233 arranged therebetween. Similarly, touch areas of the capacitive pads of each of the other second-dimension sensing lines P32~P39 are also gradually decreased along the second direction 270, and the corresponding two adjacent capacitive pads are electrically coupled with each other by a second-dimension conductive line segment arranged therebetween.

In addition, touch areas of the capacitive pads at a same coordinate location of the first direction 260 and on the first-dimension sensing lines P1~P9 are the same. In other words, since the first capacitive pad 200 of the first-dimension sensing line P1 and the first capacitive pad 220 of the first-dimension sensing line P2 are arranged in a same vertical line, the two first capacitive pads 200 and 220 are regarded to be arranged at the same coordinate location of the first direction 260, and the touch areas of the two first capacitive pads 200 and 220 are designed to be the same in this exemplary embodiment. Similarly, the touch areas of the capacitive pads at a same coordinate location of the second direction 270 and on the second-dimension sensing lines P31~P39 in accordance with this exemplary embodiment are the same. For example, since the first capacitive pad 230 of the second-dimension sensing line P31 and the first capacitive pad 250 of the second-dimension sensing line P32 are arranged in a same horizontal line, the first capacitive pads 230 and 250 are regarded to be arranged at a same coordinate location of the second direction 270, and the touch areas of the first capacitive pads 230 and 250 are designed to be the same in this exemplary embodiment. However, although the touch areas of the capacitive pads at the same coordinate location are designed to be the same in this exemplary embodiment, it is not used to limit the present invention. One skilled in the art may properly adjust the relative relationships of the touch areas of the capacitive pads of the sensing lines in practice according to the spirit of the present invention.

Referring to FIG. 2 again, as described above, the first-dimension sensing lines P1~P9 are parallel with one another and extend along the first direction 260, and the second-dimension sensing lines P31~P39 are also parallel with one another and extend along the second direction 270. The first-dimension sensing lines P1~P9 and the second-dimension sensing lines P31~P39 are arranged crossing over one another and arranged in a matrix. The processor 22 is electrically coupled to the first-dimension sensing lines P1~P9 and the second-dimension sensing lines P31~P39, and determines the location(s) of a touch point(s) on the capacitive-type touch panel 20 according to detected currents in the sensing lines P1~P9 and P31~P39.

In order to facilitate one skilled in the art to better understand how to use the above-mentioned capacitive-type touch panel to detect a plurality of touch points, a touch point detecting method adapted to the capacitive-type touch panel will be described below in detail.

Figure 3:
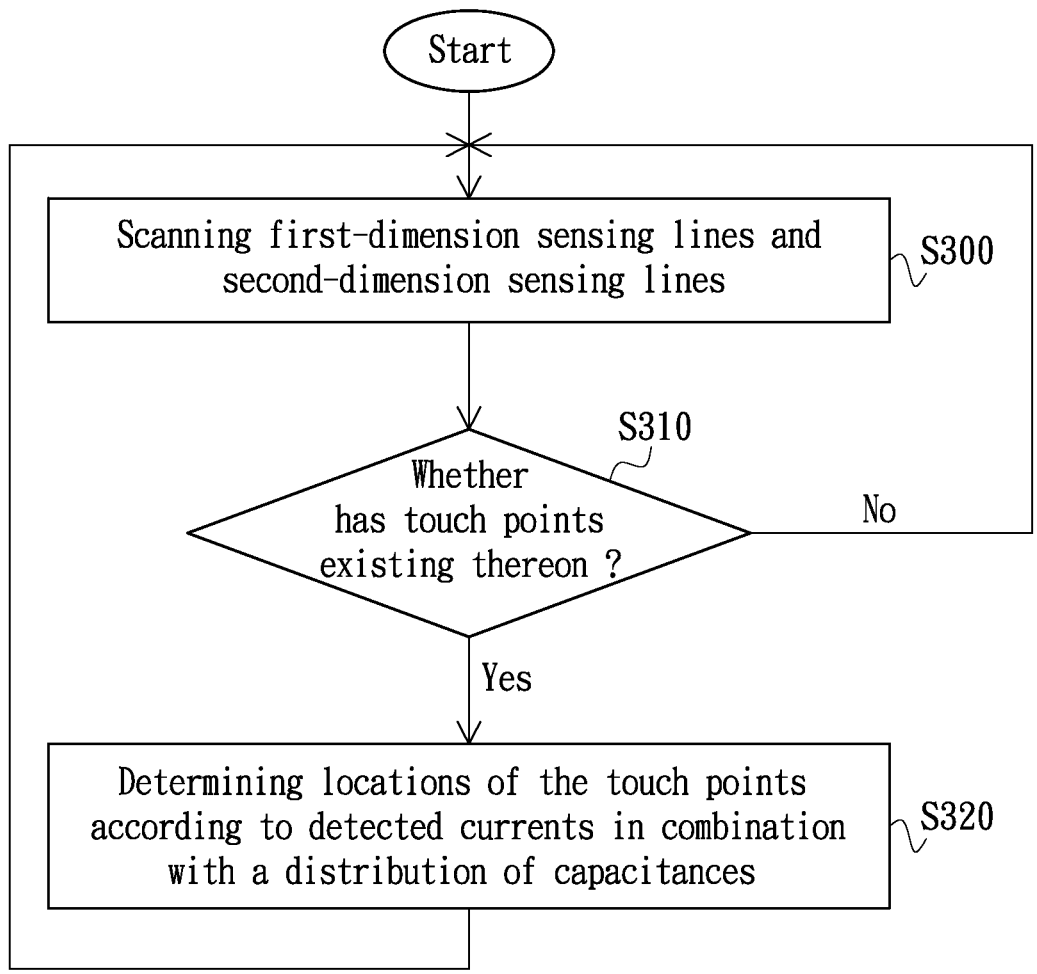
FIG. 3 is a flow chart of a touch-point detecting method of capacitive-type touch panel in accordance with an exemplary embodiment of the present invention.

Referring to FIG. 3, a flow chart of a touch-point detecting method in accordance with an exemplary embodiment of the present invention is shown. In this exemplary embodiment, the capacitive-type touch panel firstly scans the first-dimension sensing lines and the second-dimension sensing lines (Step S300), and then when detecting touch points during the scanning (Step S310), determines actual locations of the touch points according to detected currents during the scanning in combination with a distribution of capacitances of the first-dimension sensing lines or the second-dimension sensing lines (Step S320). Since it is well known by one skilled in the art how to scan the first-dimension sensing lines and the second-dimension sensing lines and detect whether have the touch points on the capacitive-type touch panel by scanning such the sensing lines, and thus only the step S320 will be described below more in detail for facilitating one skilled in the art to better understand how to employ the touch panel associated with the present invention to determine the actual locations of the touch points.

Figure 4A:
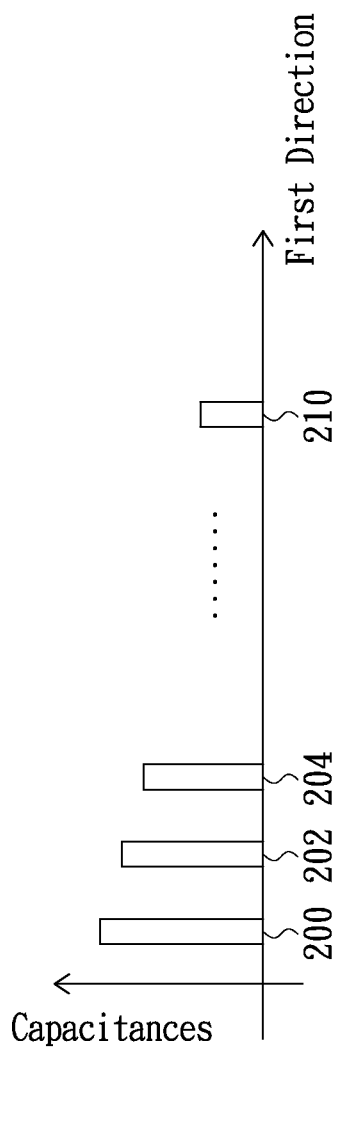
FIG. 4A shows a distribution of capacitances of one of the first-dimension sensing lines.
Figure 4B:
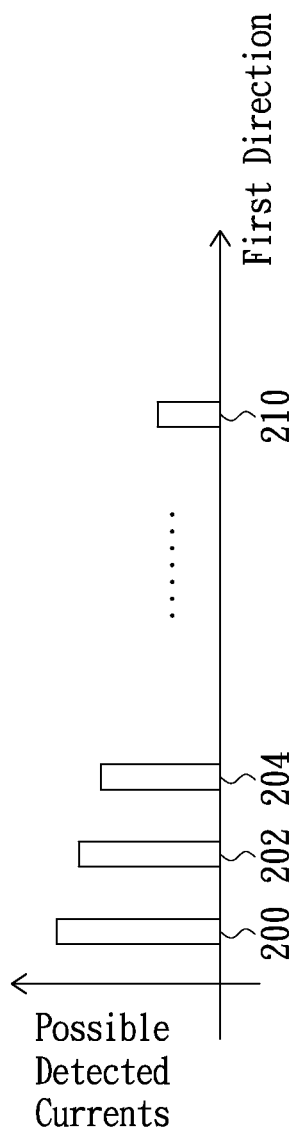
FIG. 4B shows possible detected currents when touch points are at the relative locations on the first-dimension sensing lines.
Figure 4C:
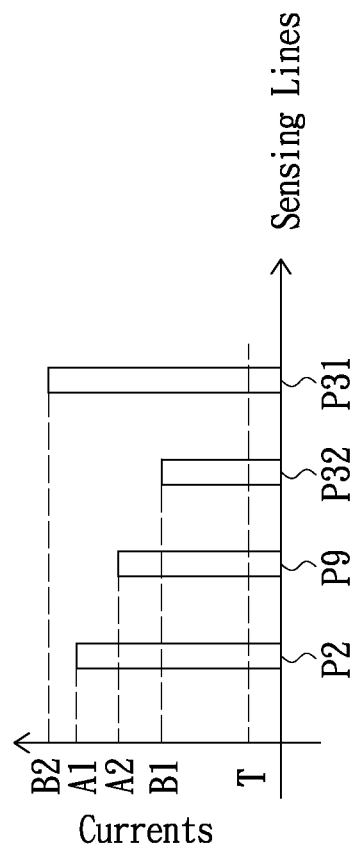
FIG. 4C shows a detecting result associated with currents when actual touch points occur.

For the convenience of description, please refer to FIGS. 2 and 4A~4C together. FIG. 4A shows a distribution of capacitances of one of the first-dimension sensing lines, FIG. 4B shows possible detected currents when the touch points are at the relative locations on the first-dimension sensing lines, and FIG. 4C shows a detecting result associated with currents when actual touch points occur. As shown in FIGS. 2 and 4A, the capacitances of the first-dimension sensing line P1 are gradually decreased along the first direction 260 from left to right, and thus as seen from FIG. 4A, the capacitance of the capacitive pad 200 is lager than the capacitance of the capacitive pad 202, and the capacitance of the capacitive pad 202 is larger than the capacitance of the capacitive pad 204 as well. For such design of the distribution of capacitances, when a touch point is located at the first-dimension sensing line P1, the detected currents will be gradually decreased from left to right as shown in FIG. 4B.

The situations as shown in FIGS. 4A and 4B are adapted to the design of the distribution of capacitances associated with the first-dimension sensing lines P1~P9 as shown in FIG. 2. Therefore, when a plurality of touch points are generated, the processor 22 of the capacitive-type touch panel 20 would detect a plurality of currents. In the exemplary embodiment as shown in FIG. 4C, the processor 22 detects one current when scanning the first-dimension sensing line P2, the value of the current A1 is above a threshold value T (representing a current generated by noise), and thus it may be determined that one touch point appears on the first-dimension sensing line P2. In addition, the processor 22 detects another current when scanning the first-dimension sensing line P9, the value of the current A2 is also above the threshold value T, and thus it may be determined that one touch point appears on the first-dimension sensing line P9. In view of the above, it is obtained that the two touch points on the first-dimension sensing lines P1~P9 are located at the first-dimension sensing line P2 and the first-dimension sensing line P9 respectively. Accordingly, the first-dimension sensing line P2 may be regarded as a first coordinate value of the detected two touch points, and the first-dimension sensing line P9 is regarded as a second coordinate value of the detected two touch points.

In regard to the second-dimension sensing lines P31~P39, similarly, since the processor 22 detects the values of currents on the second-dimension sensing lines P31 and P32 are above the threshold value T, and thus it is determined that the second-dimension sensing lines P31 and P32 respectively have the touch points appearing thereon. In view of the above, it is acquired that the two touch points on the second-dimension sensing lines P31~P39 are located at the second-dimension sensing line P31 and the second-dimension sensing line P32 respectively, and thus the second-dimension sensing line P31 may be regarded as a third coordinate value of the detected two touch points and the second-dimension sensing line P32 is regarded as a fourth coordinate value of the detected two touch points.

After obtaining the above-mentioned coordinate values, a following step is performed is how to put the coordinate values in pairs and thereby to obtain actual locations of the touch points. The embodiment of the present invention provides following four methods for the purpose of illustration, and any one of such methods may achieve the purpose of determining the actual locations of the touch points.

According to a formula I=V*2*PI*(Cp+Ct)*f, the current detected by the processor 22 is in relation to the capacitances (including a parasitical capacitance Cp and a touch-point capacitances Ct) under the conditions of same voltage (V), constant value (PI) and frequency (f) (which is disclosed in U.S. Pat. No. 6,297,811 in detail). Therefore, since the detected current A1 in the first-dimension sensing line P2 is larger than the detected current A2 in the first-dimension sensing line P9, the location of the touch point on the first-dimension sensing line P2 is closer to the left of the capacitive-type touch panel 20 than the location of the touch point on the first-dimension sensing line P9. In other words, the location of the touch point on the first-dimension sensing line P2 is closer to a start point of the second direction 270 than the location of the touch point on the first-dimension sensing line P9. In regard to the second-dimension sensing lines P31 and P32 having the touch points existed thereon, the second-dimension sensing line P31 is closer to the left of the capacitive-type touch panel 20. Accordingly, it may be determined that the intersection point of the first-dimension sensing line P2 (corresponding to the first coordinate value) and the second-dimension sensing line P31 (corresponding to the third coordinate value) is the actual location of one of the touch points.

From another point of view, the location of the touch point on the first-dimension sensing line P9 is closer to an end point of the second direction 270 than the location of the touch point on the first-dimension sensing line P2, and thus it may be determined that the intersection point of the first-dimension sensing line P9 (corresponding to the second coordinate value) and the second-dimension sensing line P32 (corresponding to the fourth coordinate value) is the actual location of another one of the touch points.

The above description is directed to two methods for determining the locations of touch points in which the first-dimension sensing lines are employed as a reference, but it is understood for one skilled in the art that the second-dimension sensing lines may be employed as the reference to determine the locations of the touch points instead. Similarly, since the detected current B2 in the second-dimension sensing line P31 is larger than the detected current B1 in the second-dimension sensing line P32, one of the first-dimension sensing lines P2 and P9 which is closer to a start point of the first direction 260, i.e., the first-dimension sensing line P2 ought to be selected, and the intersection point of the first-dimension sensing line P2 and the second-dimension sensing line P31 is determined as the actual location of one of the touch points. From another point of view, one of the first-dimension sensing lines P2 and P9 which is closer to an end point of the first direction 260, i.e., the first-dimension sensing line P9 ought to be selected, and the intersection point of the first-dimension sensing line P9 and the second-dimension sensing line P32 is determined as the actual location of another one of the touch points.

As mentioned above, the technology provided by the embodiment of the present invention may easily determine the locations of a plurality of touch points appearing on the capacitive-type touch panel at the same time. Therefore, such technology facilitates the capacitive-type touch panel associated with the embodiment of the present invention to be extended to the multipoint touch application, and the value in use of the capacitive-type touch panel is increased correspondingly.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A capacitive-type touch panel configured for detecting a touch point when an object touches the capacitive-type touch panel, the capacitive-type touch panel comprising:

a plurality of first-dimension sensing lines, wherein the first-dimension sensing lines are arranged in parallel with one another and extend along a first direction, each of the first-dimension sensing lines comprises a plurality of first-dimension capacitive pads arranged along the first direction and each of the first-dimension capacitive pads has a capacitance when no touch point occurs on the first-dimension sensing line, the capacitances being different from each other and gradually decreased along the first direction; and a processor configured for scanning the first-dimension sensing lines and determining a location of the touch point on the first-dimension sensing lines according to a result of the scanning.

2. The capacitive-type touch panel as claimed in claim 1, wherein each of the first-dimension sensing lines further comprises a plurality of first-dimension conductive line segments, each first-dimension conductive line segment is electrically coupled between the corresponding two adjacent first-dimension capacitive pads, and touch areas of the first-dimension capacitive pads of each of the first-dimension sensing lines are gradually decreased along the first direction.

3. The capacitive-type touch panel as claimed in claim 1, wherein the processor determines the location of the touch point on the first-dimension sensing lines by scanning a current in the first-dimension sensing lines when the object touches the capacitive-type touch panel.

4. A capacitive-type touch panel configured for detecting a touch point when an object touches the capacitive-type touch panel, the capacitive-type touch panel comprising:

a plurality of first-dimension sensing lines, wherein the first-dimension sensing lines are arranged in parallel with one another and extend along a first direction, each of the first-dimension sensing lines comprises a plurality of first-dimension capacitive pads arranged along the first direction and each of the first-dimension capacitive pads has a capacitance when no touch point occurs on the first-dimension sensing line, the capacitances being different from each other and gradually decreased along the first direction;

a processor configured for scanning the first-dimension sensing lines and determining a location of the touch point on the first-dimension sensing lines according to a result of the scanning associated with the first-dimension sensing lines; and a plurality of second-dimension sensing lines, wherein the second-dimension sensing lines are arranged in parallel with one another and cross over the first-dimension sensing lines, each of the second-dimension sensing lines comprises a plurality of second-dimension capacitive pads arranged along a second direction and each of the second-dimension capacitive pads has a capacitance when no touch point occurs on the second-dimension sensing line, the capacitances being different from each other and gradually decreased along the second direction, and wherein the processor is further configured for scanning the second-dimension sensing lines and determining a location of the touch point on the second-dimension sensing lines according to another result of the scanning associated with the second-dimension sensing lines.

5. The capacitive-type touch panel as claimed in claim 4, wherein each of the second-dimension sensing lines further comprises a plurality of second-dimension conductive line segments, each second-dimension conductive line segment is electrically coupled between the corresponding two adjacent second-dimension capacitive pads, and touch areas of the second-dimension capacitive pads of each of the second-dimension sensing lines are gradually decreased along the second direction.

6. The capacitive-type touch panel as claimed in claim 4, wherein the processor determines the location of the touch point on the second-dimension sensing lines by scanning a current in the second-dimension sensing lines when the object touches the capacitive-type touch panel.

7. The capacitive-type touch panel as claimed in claim 4, wherein each of the first-dimension sensing lines further comprises a plurality of first-dimension conductive line segments, each first-dimension conductive line segment is electrically coupled between the corresponding two adjacent first-dimension capacitive pads, and touch areas of the first-dimension capacitive pads of each of the first-dimension sensing lines are gradually decreased along the first direction.

8. The capacitive-type touch panel as claimed in claim 5, wherein each of the first-dimension sensing lines further comprises a plurality of first-dimension conductive line segments, each first-dimension conductive line segment is electrically coupled between the corresponding two adjacent first-dimension capacitive pads, and touch areas of the first-dimension capacitive pads of each of the first-dimension sensing lines are gradually decreased along the first direction.

9. The capacitive-type touch panel as claimed in claim 4, wherein the processor determines the location of the touch point on the first-dimension sensing lines by scanning a current in the first-dimension sensing lines when the object touches the capacitive-type touch panel.

10. A touch-point detecting method of a capacitive-type touch panel adapted for detecting a plurality of touch points on the capacitive-type touch panel, the capacitive-type touch panel comprising a plurality of first-dimension sensing lines and a plurality of second-dimension sensing lines arranged in a matrix, the first-dimension sensing lines being arranged in parallel with one another and the second-dimension sensing lines being arranged in parallel with one another, the touch-point detecting method of the capacitive-type touch panel comprising:

scanning the first-dimension sensing lines and the second-dimension sensing lines; and when detecting a first touch point and a second touch point existed on the capacitive-type touch panel at the same time, determining locations of the first touch point and the second touch point according to detected currents in the first-dimension sensing lines and the second-dimension sensing lines, wherein each of first-dimension sensing lines comprises a plurality of first-dimension capacitive pads arranged along a first direction and each of the first-dimension capacitive pads has a first capacitance when no touch point occurs on the first-dimension sensing line, the first capacitances being different from each other and gradually decreased along the first direction, each of second-dimension sensing lines comprises a plurality of second-dimension capacitive pads arranged along a second direction and each of the second-dimension capacitive pads has a second capacitance when no touch point occurs on the second-dimension sensing line, the second capacitances being different from each other and gradually decreased along the second direction.

11. The touch-point detecting method of the capacitive-type touch panel as claimed in claim 10, wherein the step of determining the locations of the first touch point and the second touch point according to the detected currents in the first-dimension sensing lines and the second-dimension sensing lines when detecting the first touch point and the second touch point existed on the capacitive-type touch panel at the same time comprises:
   obtaining a first coordinate value and a second coordinate value of the first touch point and the second touch point respectively on the first-dimension sensing lines according to the detected currents in the first-dimension sensing lines;
   obtaining a third coordinate value and a fourth coordinate value of the first touch point and the second touch point respectively on the second-dimension sensing lines according to the detected currents in the second-dimension sensing lines; and
   putting the first coordinate value, the second coordinate value, the third coordinate value, and the fourth coordinate value in pairs according to the detected currents in the first-dimension sensing lines and the second-dimension sensing lines to obtain the locations of the first touch point and the second touch point.

12. The touch-point detecting method of the capacitive-type touch panel as claimed in claim 11, wherein the step of putting the first coordinate value, the second coordinate value, the third coordinate value, and the fourth coordinate value in pairs according to the detected currents in the first-dimension sensing lines and the second-dimension sensing lines to obtain the locations of the first touch point and the second touch point comprises one of the followings:
   when the current obtained for detecting the first touch point is larger than the current obtained for detecting the second touch point in the first-dimension sensing lines, selecting one of the third coordinate value and the fourth coordinate value which is closer to a start point of the first direction as a second-dimension location of the first touch point;
   when the current obtained for detecting the first touch point is smaller than the current obtained for detecting the second touch point in the first-dimension sensing lines, selecting one of the third coordinate value and the fourth coordinate value which is closer to an end point of the first direction as a second-dimension location of the first touch point;
   when the current obtained for detecting the first touch point is larger than the current obtained for detecting the second touch point in the second-dimension sensing lines, selecting one of the first coordinate value and the second coordinate value which is closer to a start point of the second direction as a first-dimension location of the first touch point; and
   when the current obtained for detecting the first touch point is smaller than the current obtained for detecting the second touch point in the second-dimension sensing lines, selecting one of the first coordinate value and the second coordinate value which is closer to an end point of the second direction as a first-dimension location of the first touch point.

* * * * *